United States Patent [19]

DiCiaccio et al.

[11] 4,340,814
[45] Jul. 20, 1982

[54] ELECTRO-OPTICAL POSITION TRANSDUCER

[75] Inventors: James J. DiCiaccio, Somerville, Mass.; John J. Foley, Jr., Weare, N.H.

[73] Assignee: Dynamics Research Corporation, Wilmington, Mass.

[21] Appl. No.: 196,596

[22] Filed: Oct. 14, 1980

[51] Int. Cl.³ .............................................. H04L 3/00
[52] U.S. Cl. .......................... 250/231 SE; 250/237 G
[58] Field of Search .................... 250/231 SE, 237 G; 356/395; 340/347 P

[56] References Cited

U.S. PATENT DOCUMENTS 3,525,094 8/1970 Leonard .................. 250/231 SE X

Primary Examiner—David C. Nelms
Assistant Examiner—Darwin R. Hostetter
Attorney, Agent, or Firm—Weingarten, Schurgin & Gagnebin

[57] ABSTRACT

An electro-optical encoder having a head assembly adapted for movement relative to an encoder scale and including a single compact efficient reflective light source providing illumination of a plurality of reticles and associated scale portions.

9 Claims, 5 Drawing Figures

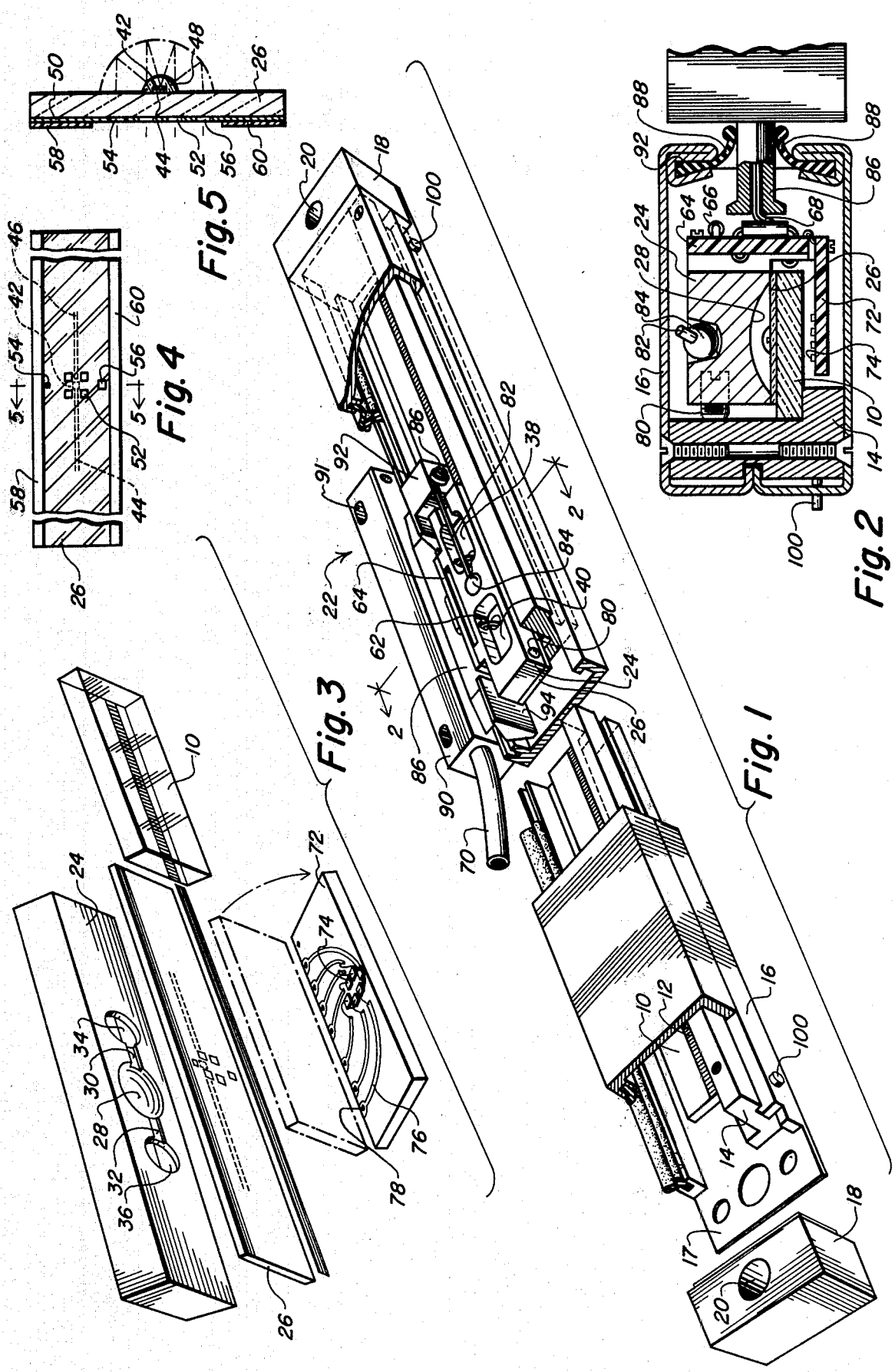

4,340,814

ELECTRO-OPTICAL POSITION TRANSDUCER

FIELD OF THE INVENTION

This invention relates to position transducers and more particularly to an electro-optical linear encoder for indicating the position of a movable element along a travel path.

BACKGROUND OF THE INVENTION

Linear encoders are known for providing a signal indication of the position of a movable element along a travel path. In a typical electro-optical incremental linear encoder, an elongated glass or other light transmissive scale is disposed along a travel path and includes an array of regular rulings which provide alternately light transmissive and opaque lines. One or more reticles are provided for movement in relation to the scale, the reticles having a similar array of rulings which are cooperative with the scale array to provide fringe patterns which are sensed to provide an output indication of the position of the reticle in relation to the scale. A light source is provided to illuminate the reticle and scale, the fringe patterns being detected by one or more photosensors. Usually a pair of reticles is employed which are relatively offset to provide photosensor signals which are in phase opposition. A second pair of reticles is often employed to provide a second pair of photosensor signals which are in phase opposition with each other and in phase quadrature with the first pair of signals. These photosensor signals are utilized in associated signal processing circuitry to provide output indications of relative position and sense of movement. Examples of linear encoders are shown in U.S. Pat. Nos. 3,816,003, 3,867,037 and 4,039,826 of the present assignee.

The light source typically includes an incandescent bulb or light emitting diode and a lens for providing a generally collimated light beam for transmission through the reticle and scale patterns. If a single light source is employed to illuminate the several reticles, this source can be quite large in both diameter and depth to accommodate a lens of sufficient aperture to illuminate all of the reticles. In order to reduce the size of the encoder, separate light sources have been employed for each reticle; however, use of such plural light sources can result in variation in the light intensity of the respective light beams, and corresponding variation in the photosensor output signals.

SUMMARY OF THE INVENTION

Briefly, the present invention provides an electro-optical linear encoder having a head assembly with a single compact efficient reflective light source providing illumination of a plurality of reticles and associated portions of the encoder scale. The head assembly includes a support member having a parabolic reflector therein and a glass or other suitable plate affixed to the support member and containing on its inner surface a light emitting diode chip disposed at the focus of the parabolic reflector. A plurality of reticles are provided on the plate and disposed to be illuminated by light from the parabolic reflector. The plate includes bearing surfaces which ride on the associated scale to maintain the plate and scale in close light coupling relationship. A circuit board or other support contains a plurality of photosensors and is disposed on the opposite side of the scale from the light source to receive light transmitted through the reticles and associated scale portions and to produce electrical signals representing the position of the head assembly along the length of the scale.

DESCRIPTION OF THE DRAWINGS

The invention will be more fully understood from the following detailed description taken in conjunction with the accompanying drawings, in which:

FIG. 1 is a cutaway pictorial view of a linear encoder constructed and operative in accordance with the invention;

FIG. 2 is a sectional view taken along lines 2—2 of FIG. 1;

FIG. 3 is an exploded pictorial view of the head assembly;

FIG. 4 is a plan view of the reticle plate; and

FIG. 5 is an enlarged sectional view of the reticle plate and taken along lines 5—5 of FIG. 4.

DETAILED DESCRIPTION OF THE INVENTION

The novel linear encoder is shown in FIGS. 1 and 2 and includes an elongated scale 10 formed of a light transmissive material, typically glass, and having an array 12 of alternatively light transmissive and opaque segments formed on a surface of the scale and along the active length of the scale. The scale 10 is mounted on a support member 14 which in turn is mounted within a housing 16 which in the illustrated embodiment is formed of steel, aluminum, or other metal. End caps 18 are provided at each end of housing 16 to seal the housing ends and provide a substantially enclosed encoder structure. The housing is mounted in intended position on a machine or other apparatus with which the encoder is to be employed by means of fasteners which are disposed through mounting openings 20 in the end caps and housing. The head assembly 22 is adapted to be attached to a movable element of a machine or other associated apparatus and to move along the scale 10 to provide an electrical output signal representative of the position of the movable head assembly along the scale length and from which, by appropriate calibration, an encoder output signal is provided representing the position of the movable element in relation to a reference position.

The head assembly includes a support member 24 having mounted on one surface thereof a reticle plate 26 and a unitary light source for illumination of the several reticle patterns and associated portions of the ruled array 12 of scale 10. The support member 24 and associated reticle plate and light source are further illustrated in FIGS. 3–5. As best seen in FIG. 3, the support member 24 includes a parabolic reflector 28 formed in the surface confronting the reticle plate, and outwardly extending grooves 30 and 32, each terminating in a respective hole 34 and 36 extending through member 24. The side of member 24 opposite to that containing the parabolic reflector is as shown in FIG. 1 and includes recessed areas 38 and 40 in which respective openings 34 and 36 terminate, these recesses and openings serving to accommodate electrical leads for a light emitting diode, as will be described.

The reticle plate 26 includes on the surface confronting the parabolic reflector, a solid state light emitting device such as a light emitting diode chip 42 which is disposed at the focus of the parabolic reflector 28 such that the diode illumination will be reflected by the parabolic surface as a generally collimated uniform light beam. The light emitting diode 42 is energized by means of a pair of conductors 44 and 46. The diode chip is typically mounted on one end of conductive path 44, and the second electrical connection is made by wire-bonding the diode to the other conductive path 46. The conductive paths 44 and 46 are formed on the surface of the reticle plate by printed circuit or film deposition techniques, or by adhesively applied conductive tape. The diode and wire-bond connection is encapsulated in a clear epoxy bead 48. The light emitting diode 42 serves as a "point" source with substantially no shadowing of the reflected light, and also serves as a heater within the cavity of the reflector to prevent moisture formation on the reticles and reflector surface.

An opaque coating 50 is provided on the opposite surface of reticle plate 26 and four reticle areas 52 are provided in a square array. Each reticle area includes an array of alternating light transmissive and opaque lines the same as the line array 12 of the encoder scale 10. A transparent window areas 54 is provided above the retical areas and serves to provide a zero reference bias. A window area 56 is provided below the retical areas and includes a coded optical pattern which is operative with a corresponding optical pattern at a selected position on scale 10 to provide a zero reference indication. A pair of raised strips 58 and 60 are disposed along the respective opposite edges of the retical plate surface containing the retical patterns. These strips are typically formed by deposition and baking of a fluorocarbon material, and in the assembled encoder ride on the confronting surfaces of scale 10 to provide a small gap between the scale area 12 and the confronting retical area. Typically a gap of 0.0008 inch is provided.

The reticle plate is cemented or otherwise joined to the confronting surface of member 24, with the light emitting diode 42 disposed at the focus of parabolic reflector 28, and with the reticle areas 52 and window areas 54 and 56 disposed within the aperture of the parabolic reflector to receive illumination therefrom. The parabolic reflector is dimensioned to provide an active light area which is approximately the inner three-quarters of the parabolic surface. As a result, the light intensity is substantially collimated and uniform and relatively intense, since the annular peripheral area of the parabolic surface is not employed. This light source is 60–70 percent efficient; that is, the amount of light reflected onto the reticles and scale in relation to the total light generated is 60–70 percent, in contrast to conventional lens-type sources, which are typically about 20 percent efficient. The overall optical path of the encoder is very short, and collimation is less critical in comparison to conventional light sources, since the optical patterns of the scale and reticles are close to the light aperture. Preferably, the optical pattern on the scale is on the surface adjacent to the reticle plate surface containing the reticle areas. The focal length of this illumination system is typically about one-fourth that of a conventional lens system.

The outer ends of the conductive paths 44 and 46 terminate at the respective holes 36 and 34 through which electrical leads 62 are soldered or otherwise bonded to the respective conductive paths for coupling of the light emitting diode to an electrical power source. The leads 62 extend through openings in recesses 38 and 40 to a circuit board 64 which includes current-limiting resistors 66 or other associated circuitry and from which electrical leads 68 extend to the interconnecting cable 70 which provides electrical connection of the encoder to an electrical power source and to signal utilization circuitry.

A circuit board 72 is disposed adjacent the opposite surface of scale 10 from the support member 24 and is attached to the support member for movement therewith. This circuit board 72 includes a plurality of solid state light sensors typically phototransistors chips 74 disposed in alignment with the respective reticle areas 52 and window areas 54 and 56 of the reticle plate. The phototransistors 74 are connected via associated circuit paths 76 to terminal areas 78 which are connected to the encoder cable 70. The support member 24 includes outwardly extending posts 80 which are adapted to ride along the confronting surface of scale support plate 14 to maintain the head assembly in appropriate alignment as the head assembly moves along the length of the scale 10. The posts 80 are adjustable inwardly and outwardly of the member 24 for adjustment of the position of the head assembly with respect to the scale, and more particularly, the scale array 12. The posts 80 are preferably formed of a low friction, non-abrasive material such as Delrin or Celcon. The head assembly can be adjusted laterally along the width of the scale 10 by adjustment of both posts 80, or by adjustment of one or the other of the posts, the head assembly can be angularly adjusted.

The support member 24, and associated reticle plate and other components, is resiliently connected to the head assembly by means of a coupler 82 which includes a length of resilient wire terminating in a spherical ball 84 disposed within a recess provided in member 24. The wire portion of coupler 82 is affixed to a portion of the head assembly by means of a threaded fastener 86. The coupler is biased to provide a force along a direction substantially perpendicular to the reticle plate surface, and along a direction generally parallel to the axis of posts 80 to urge the support member 24 into contact with the scale 10 and into contact with the confronting surface of scale support 14. The coupler is substantially rigid in its longitudinal axis which is generally parallel to the axis of motion to provide positive driving force to the support member 24 and associated elements. The coupler is, however, resilient in transverse axes to the axis of motion to permit motion along such transverse axes to accommodate distortions which may be present along the travel path surfaces. The ball 84 of the coupler has its center substantially on the optical axis of the head assembly such that if misalignment occurs, the coupler wire can rotate to accommodate the misalignment, but the ball will tend to remain stable and not impart spurious linear movement to the assembly.

The head assembly includes a blade member 86 which extends through a sliding seal provided by a pair of resilient strips 88 and which terminates externally of the housing in a junction box 90 in which connecting cable 70 is electrically connected to the solid state light source and photosensors of the movable head assembly. The blade member 86 terminates within the housing in a mounting portion 92 to which the wire coupler is affixed and in a spreader portion 94 which rides adjacent to the resilient sliding seal. The spreader 94 is operative to open the resilient strips 88 as the head assembly moves along the scale. The spreader also serves as a shield against any fluid splashing or otherwise entering through the gap in the resilient strips into the encoder interior. In effect, the spreader acts as a deflector to direct any splashing fluid away from the working elements. The blade member 86 includes tapered end portions for ease of movement through the confronting resilient sealing strips 88. The sealing strips are secured within openings 92 provided in the housing 16.

The housing 16 and scale support 14 are typically fabricated of steel having a temperature coefficient which approximates that of the machine on which the encoder is to be used and which also approximates the temperature coefficient of the glass scale 10. The steel also has about the same structural stiffness as that of the associated machine to prevent undue stress on the encoder. The support member 24 of the head assembly is typically fabricated of aluminum with the parabolic reflector surface being provided in well-known manner by polishing. A silicon monoxide or other anti-oxidizing coating is preferably provided over the reflective surface to maintain its reflective properties.

First and second alignment posts 100 are provided on housing 16 and outwardly extend therefrom, the distal ends of these posts lying in a plane parallel to scale 10. The encoder housing can be readily installed on an associated machine with the scale in predetermined disposition by means of the alignment posts 100. With the housing affixed to the associated machine, the head assembly is attached to the movable machine element by means of junction box 90 and openings 91. The housing 16 includes end flanges 17 which preferably are somewhat flexible to accommodate a non-parallel mounting surface without stressing the encoder scale.

The invention has been described above in association with a linear encoder. It will be appreciated that the invention is equally useful in rotary encoders and in rotary and linear encoders of the reflective type as well as the transmissive type. Accordingly, it is not intended to limit the invention by what has been particularly shown and described except as indicated in the appended claims.

What is claimed is:

1. An electro-optical linear encoder comprising:
    an elongated housing;
    an elongated scale within said housing and having a plurality of alternately light responsive and non-responsive segments in parallel array along the longitudinal axis of one surface thereof and a first bearing surface thereon parallel to the longitudinal axis, along which an associated head assembly is caused to move;
    said housing providing a second bearing surface parallel to the longitudinal axis and lying in a plane intersecting the plane of the first bearing surface along which the associated head assembly is caused to move;
    a head assembly including:
    a support member having means slidably engaging the second bearing surface for movement therealong;
    a parabolic reflector formed in the support member;
    a reticle plate mounted on the support member and over the parabolic reflector, the plate having at least one reticle disposed within the aperture of the parabolic reflector and having a plurality of alternately light responsive and non-responsive segments formed in a parallel array along the longitudinal axis of the plates, and the plate having bearing surfaces for slidable engagement with the first bearing surface;
    a solid state light emitting device disposed on the inner surface of the reticle plate at the focus of the parabolic reflector;
    sensor means within the housing for detecting light transmitted through the scale and reticle and for providing electrical signals in response thereto; and
    means for coupling the head assembly to the housing for movement along the scale.

2. The encoder of claim 1 wherein said coupling means includes means for maintaining the head assembly in alignment during movement thereof along the scale.

3. The encoder of claim 2 wherein said alignment means includes a resilient coupler operative to provide a biasing force to maintain the reticle plate in slideable engagement with the scale, and being resilient in planes transverse to the scale.

4. The encoder of claim 1 wherein said reticle plate includes strips of low friction material formed along parallel edges of the plate to provide the bearing surfaces.

5. The encoder of claim 1 wherein said reticle plate includes a plurality of reticles disposed within the aperture of the parabolic reflector and in position to be in operative association with the segments of said scale to provide electrical signals of respective phase.

6. The encoder of claim 5 wherein said reticle plate includes a zero reference pattern cooperative with a corresponding pattern on the elongated scale to provide a zero reference indication.

7. For use in an electro-optical encoder, including a scale moveable along a travel path and having a plurality of alternating light-responsive and non-responsive segments and means for providing electrical signals indicative of the relative position of the scale along its path, an illumination source comprising:
    a parabolic reflector;
    a solid state light emitting device disposed at the focus of the parabolic reflector; and
    means for mounting the reflector in confronting relation to the encoder scale to provide substantially collimated uniform intense illumination of intended portions of the scale.

8. The illumination source of claim 7 including:
    a plate disposed over the parabolic reflector;
    said solid state light emitting device being disposed on the inside surface of the plate at the focus of the parabolic reflector; and
    conductive leads formed on the inside surface of the plate and in electrical connection with the light emitting device by which energizing current can be applied.

9. The illumination source of claim 8 wherein said plate has an opaque coating thereon and in which is provided at least one reticle through which light from the parabolic reflector is transmitted onto the scale.

* * * * *